(12) United States Patent
Guo et al.

(10) Patent No.: US 7,609,288 B2
(45) Date of Patent: Oct. 27, 2009

(54) METHOD AND APPARATUS OF TRANSFERRING THE DESKTOP OF PC TO VIDEO COMMUNICATION TERMINAL

(75) Inventors: Ge Guo, Shenzhen (CN); Wuzhou Zhan, Shenzhen (CN); Fang Xu, Shenzhen (CN); Hui Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 983 days.

(21) Appl. No.: 11/049,217

(22) Filed: Feb. 2, 2005

(65) Prior Publication Data

US 2005/0151835 A1     Jul. 14, 2005

Related U.S. Application Data

(63) Continuation of application No. PCT/CN03/00627, filed on Aug. 4, 2003.

(30) Foreign Application Priority Data

Aug. 7, 2002    (CN) ............................... 02128762.7

(51) Int. Cl.
*H04N 7/14* (2006.01)
*G06F 15/16* (2006.01)

(52) U.S. Cl. ............... 348/14.08; 348/14.01; 348/14.03

(58) Field of Classification Search ... 348/14.01–14.16; 370/260, 261; 709/204, 205; 715/753, 755, 715/751
See application file for complete search history.

(56) References Cited

U.S. PATENT DOCUMENTS 5,062,136 A    10/1991 Rieger

| | | |
|---|---|---|
| 5,351,076 A | 9/1994 | Hata et al. |
| 5,854,892 A | 12/1998 | Liu et al. |
| 6,073,192 A | 6/2000 | Clapp et al. |
| 6,285,471 B1 | 9/2001 | Pornbacher |
| 6,560,637 B1 * | 5/2003 | Dunlap et al. ............... 709/204 |
| 2002/0154209 A1 * | 10/2002 | Kenoyer et al. .......... 348/14.07 |

FOREIGN PATENT DOCUMENTS

EP        0898424 A2    2/1999
WO    WO 02/099582 A2   12/2002

* cited by examiner

*Primary Examiner*—Melur Ramakrishnaiah

(57) ABSTRACT

The invention discloses a method for transferring desktop information of a PC to a video communication terminal. The method includes steps as follow: capturing desktop information of a PC after having received a triggering command, and converting a format of the PC desktop information into a format of the a video communication terminal; encoding the converted desktop format in a mode ensured by the local video communication terminal; sending the coded bit stream to the local video communication terminal; receiving the said coded bit stream by the local video communication terminal, and transferring to a remote video communication terminal after being processed. The invention also discloses an apparatus for transferring desktop information of a PC to a video communication terminal that includes a background processing-device and a terminal processing-device. The background processing-device includes a capture driver, a capturing device, an image converter, a background encoder and a background bit stream sender; the terminal processing-device includes a terminal bit stream transmitter. With the method and device, any desktop information of a PC can be transferred to a remote video communication terminal integrally and clearly.

17 Claims, 3 Drawing Sheets

METHOD AND APPARATUS OF TRANSFERRING THE DESKTOP OF PC TO VIDEO COMMUNICATION TERMINAL

CROSS-REFERENCE TO RELATED APPLICATIONS

This application is a continuation of International Application No. PCT/CN03/000627, filed Aug. 4, 2003. This application claims the benefit of Chinese Patent Application No. 02128762.7, filed on Aug. 7, 2002. The disclosures of the above applications are incorporated herein by reference.

FIELD OF THE INVENTION

The invention relates generally to a video communication field, specifically to a method for transferring desktop information of a PC to a video communication terminal and an apparatus thereof.

BACKGROUND OF THE INVENTION

In a video communication field, especially in a videoconferencing system, usually it needs to transfer desktop information, such as films or file information, to the remote video communication terminal at the same time while a local image such as an image taken by a video camera is transferred, to a remote video communication terminal.

There are two solutions for the above requirement. The first solution is as follow: projecting desktop information of a PC by a projector, capturing the projected image by the video camera of a videoconference terminal and then sending to the videoconference terminal, transferring the desktop information to a remote video communication terminal after processing. The second solution is as follow: transforming the desktop information to a standard PAUNTSC (Phase Alternating Line/National Television System Committee) format signal by a VGA (Video Graphic Array) converter, inputting the PAUNTSC format signal to the videoconference terminal as one of the video source signals, then transferring the desktop information to a remote video communication terminal after processing by the videoconference terminal.

Although, the above solutions are simple and real-time, but there are some disadvantages so that transmission of desktop information of a PC cannot be solved perfectly. In the first solution, to keep higher clarity the visual part of the captured image becomes smaller, i.e. the desktop information cannot be wholly transferred at a time. In the second solution, there is a loss during converting a digital signal to an analog signal in the VGA converter, so that clarity of all images that pass through the VGA converter decreases greatly; although clarity can be raised slightly by partly amplifying desktop information and then transferring to the remote terminal, but it is complicated in operation and quality of the reproduced image is still unsatisfied.

SUMMARY OF THE INVENTION

Because of the disadvantages mentioned above, the invention proposes a method and apparatus that can transfer desktop information to remote video communication terminal integrally and clearly.

The scheme is as follows:

A method for transferring desktop information of a PC to a video communication terminal, comprising, a. capturing desktop information of the PC after receiving a triggering command, and converting a PC format of the desktop information into a format of a local video communication terminal;

b. encoding the converted desktop format in a mode ensured by the local video communication terminal;

c. sending the coded bit stream to the local video communication terminal;

d. receiving the said coded bit stream by the local video communication terminal, and transferring to a remote video communication terminal through transmission channel after processing.

Wherein Step a further comprises, pre-processing the captured desktop information. The step of pre-processing comprises, removing the unnecessary desktop information, and then filtering and editing the rest of desktop information.

The Step d further comprises, simultaneously transferring the coded bit stream of desktop information and that of local image in a multiplex encoding mode.

An apparatus for transferring desktop information of a PC to a video communication terminal, comprises, a background processing-device, capturing desktop information of the local PC, converting the captured desktop information from a PC format to a format of the local video communication terminal, encoding the converted format to a coded bit stream and outputting;

a terminal processing-device, transferring the coded bit stream from said background processing-device to a remote video communication terminal.

wherein terminal processing-device comprises a terminal bit stream transmitter that transfers the said coded bit stream to the remote video communication terminal.

Advantages of the invention are as following:

1. Desktop information of a PC is transferred directly in a digital coded bit stream mode without converting digital signal to analog signal, so the clarity on the video communication terminal is raised;

2. The desktop information is pre-processed before transmission, so it needs less bandwidth and the displayed content includes text files, films and anything that can display on a PC screen;

3. When the desktop information is unchanged, it is not captured so that system resource is saved;

4. Moving images and the desktop information can be transmitted, respectively, simultaneously or alternatively.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The invention will be described in more detail with reference to an embodiment and drawings 1, 2, 3 and 4.

Figure 1:
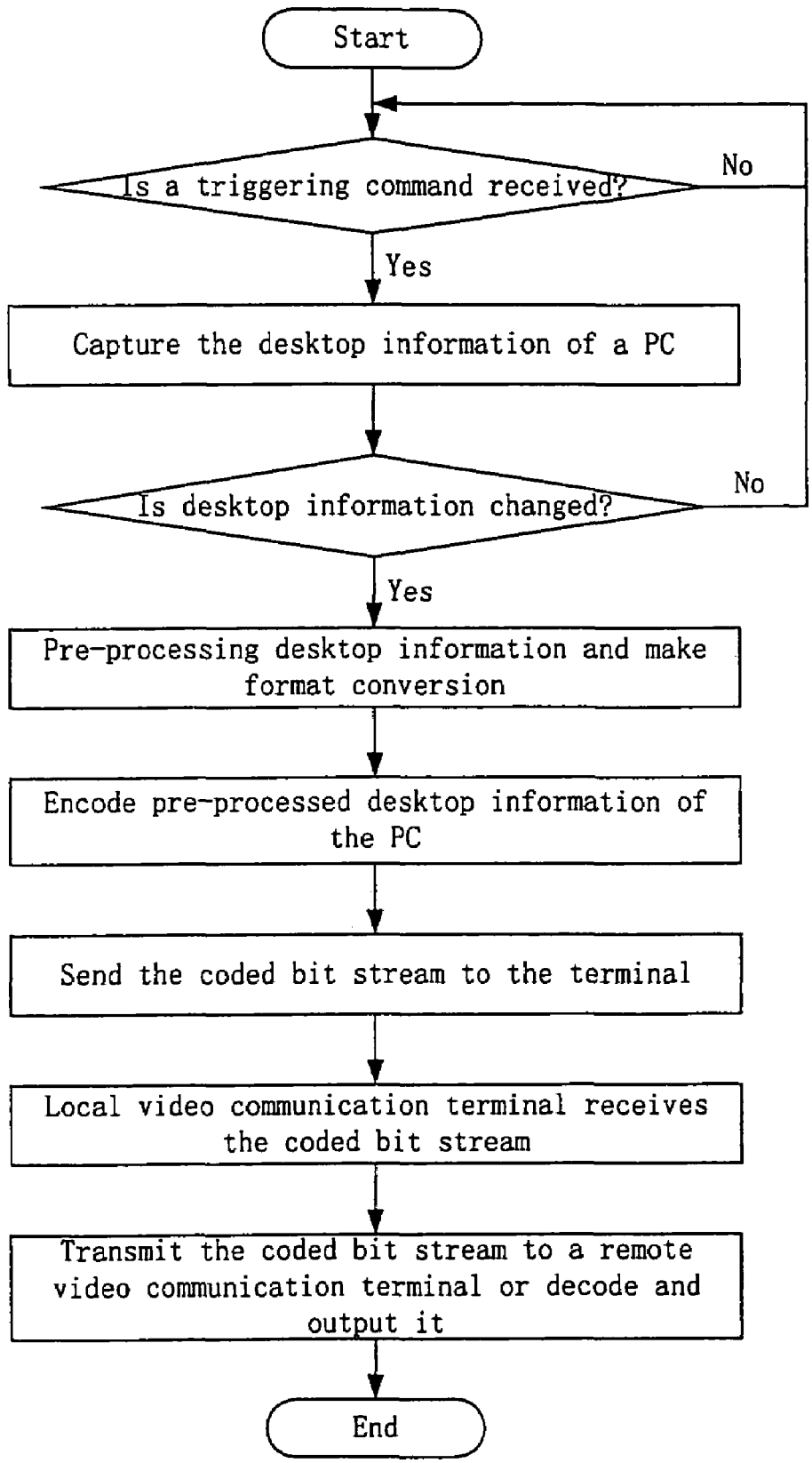
FIG. 1 shows a flowchart of the invention.

FIG. 1 shows that desktop information is transferred as follows:

Step 1, waiting for a triggering command from the capture driver 21;

Step 2, capturing the desktop information and detecting whether the desktop information has been changed; if it is, go to the next step, otherwise return to step 1;

Step 3, making various pre-process for the desktop information based on requirement;

Step 4, converting the PC format of the desktop information to a format of a local video communication terminal;

Step 5, encoding the desktop information of PC into a video bit stream of which type can be a H.261 bit stream, a H.263 bit stream or a JPEG bit stream etc. Modes of encoding are considered based on many factors, such as the speed rate of a line, processing capability of the PC and the terminal, time delay, and clarity of an image etc.; for example, when the desktop information is encoded into a H.261 or H.263 bit stream, in order to have a higher clarity, Annex D of ITU-T H.261 is used.

Step 6, sending the coded bit stream to the local video communication terminal;

Step 7, receiving the coded bit stream by the local video communication terminal;

Step 8, decoding the coded bit stream, and sending the decoded information to the local output device 35 in order to display the desktop information; detecting whether the local encoding mode of said coded bit stream is same as that of the remote video communication terminal, if it is, the coded bit stream is transferred to the remote video communication terminal through a transmission channel directly; otherwise the coded bit stream is decoded first, and the decoded information is encoded again with the remote encoding mode, and then it is transferred to the remote video communication terminal through the transmission channel.

Figure 4:
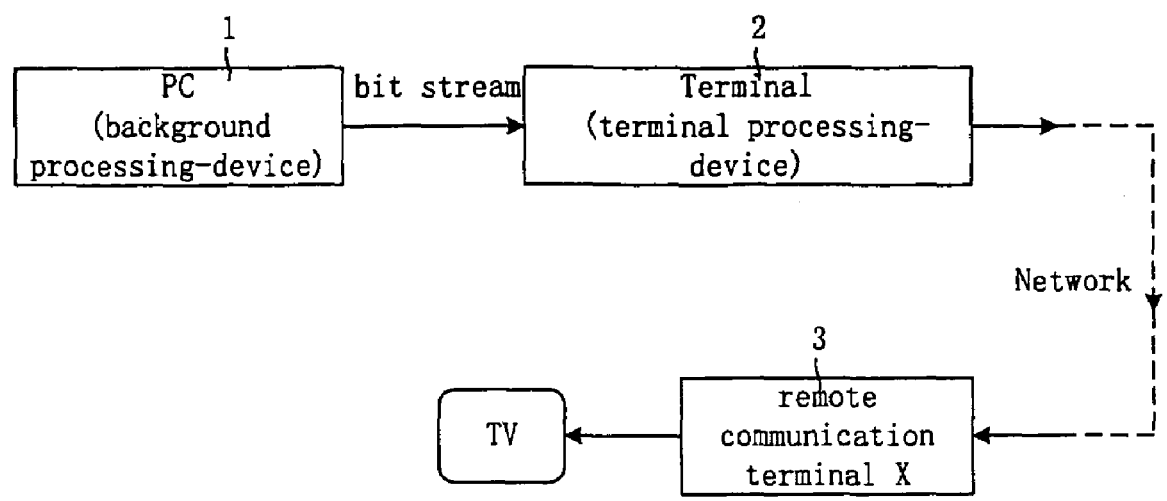
FIG. 4 shows a system diagram of the invention.

As shown in FIG. 4, the PC has a background processing-device 1 to capture the desktop information of the PC, and then the captured desktop information is encoded and sent, through a network port, to the local video communication terminal that has a terminal processing-device 2, and then the local video communication terminal forwards the received coded bit stream to the remote video communication terminal 3; in this way, transmission of desktop information between the local video communication terminal and the remote video communication terminal is implemented.

Figure 2:
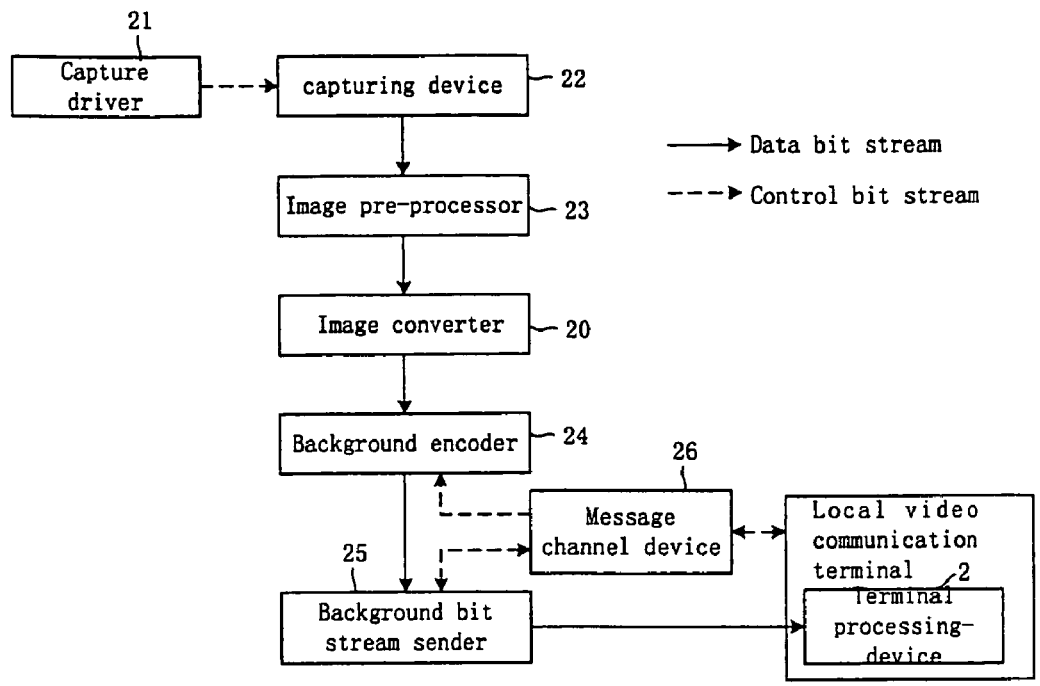
FIG. 2 shows a block diagram of the background processing-device.

FIG. 2 shows that the background processing-device includes, a capture driver 21, a capturing device 22, an image pre-processor 23, an image converter 20, a background encoder 24, a background bit stream sender 25 and a message channel device 26.

The operation of the background processing-device is as following. The capture driver 21 outputs a triggering command to the capturing device 22 for capturing an image; the capturing device 22 captures the desktop information from the video memory of the PC and outputs to the image pre-processor 23 for processing, which includes filtering the desktop information to raise quality of the image, editing the desktop information etc.; preferably based on whether the desktop information has been changed, the image pre-processor 23 determines whether the current desktop information will go on being processed or be discarded; the image converter 20 converts the image format outputted from the image pre-processor 23 to an image format of the local video communication terminal, such as format conversion and resolution conversion etc.; the converted image is sent to the background encoder 24 that encodes them with a mode ensured by the local video communication terminal; the coded bit stream is sent to the background bit stream sender 25 that sends to the terminal processing-device through a network port.

The message channel device 26 is set between the terminal processing-device 2 and the background processing-devices; it sends the encoding message of the local video communication terminal to the background encoder for defining the encoding mode, and sends the video message of the local video communication terminal to the background bit stream sender to define the transmitting rate based on the videoconference speed rate and the videoconference video attribute etc., and it also sends the control message from the background bit stream sender to the terminal processing-device to start or stop transmission of the coded bit stream from the terminal processing-device to the remote video communication terminal.

Figure 3:
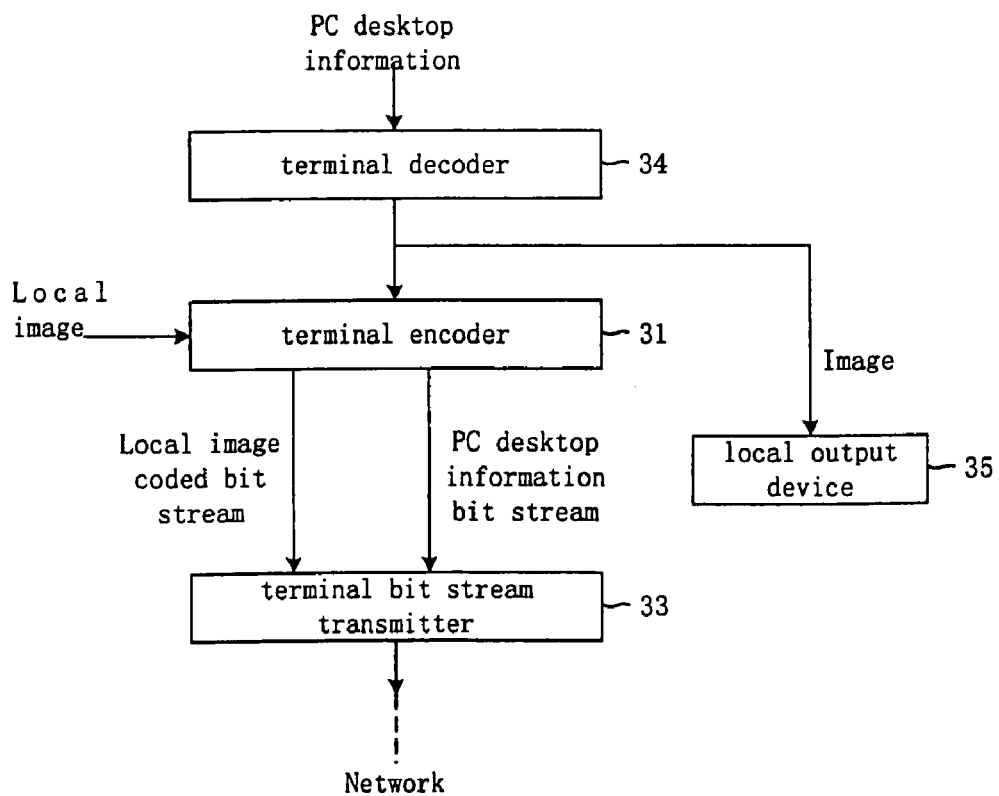
FIG. 3 shows a block diagram of the terminal processing-device.

FIG. 3 shows a terminal processing-device that includes a terminal encoder 31, a terminal bit stream transmitter 33 and a terminal decoder 34. Having been encoded by the terminal encoder 31, the local image is outputted to the terminal bit stream transmitter 33. The terminal decoder 34 decodes the coded bit stream outputted from the background processing-device, and the decoded bit stream may be sent to the terminal bit stream transmitter 33, which can respectively transfer the coded bit stream of desktop information or the local image, or can transfer them simultaneously in a multiplex encoding mode.

Since the encoding mode of the local video communication terminal and that of the remote video communication terminal may be different, the terminal decoder 34 first decodes the coded bit stream outputted from the background bit stream sender, and then the terminal encoder 31 encodes the decoded bit stream in the remote terminal encoding mode and sends it to the terminal bit stream transmitter 33. Of course, when the encoding mode of the local video communication terminal is same as that of the remote terminal, the desktop information coming from the PC is sent to the terminal bit stream transmitter 33 directly.

In order to display the desktop information in the local output device, having been decoded by the terminal decoder 34, the desktop information is sent to the local output device for display.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for transferring desktop information of a PC to a video communication terminal, comprising, a) capturing desktop information of the PC after receiving a triggering command, and converting a PC format of the desktop information into a format of a local video communication terminal;

b) encoding the converted desktop format in a mode ensured by the local video communication terminal;

c) sending the coded bit stream to the local video communication terminal;

d) receiving the coded bit stream by the local video communication terminal and transferring to a remote video communication terminal through transmission channel after processing.

2. The method according to claim 1, wherein Step a further comprises: pre-processing the desktop information captured.

3. The method according to claim 2, the step of pre-processing comprises: removing unnecessary desktop information, and then filtering and editing the rest of the desktop information.

4. The method according to claim 1, wherein Step a further comprises:
after capturing the desktop information, detecting whether the desktop information captured has been changed; if it is, going to next step, otherwise waiting for the triggering command.

5. The method according to claim 1, the desktop information in Step a is captured from a video memory of the PC.

6. The method according to claim 1, wherein Step d further comprises: decoding the received coded bit stream and then outputting to a local output device.

7. The method according to claim 1, said Step d further comprises: simultaneously transferring the coded bit stream of the desktop information and that of a local image in a multiplex encoding mode.

8. The method according to claim 1, wherein the processing of Step d comprises: detecting whether the local encoding mode of the coded bit stream is same as that of the remote video communication terminal; if it is, transferring the coded bit stream directly, otherwise decoding the coded bit stream first, and then encoding again in a mode of the remote video communication terminal.

9. An apparatus for transferring desktop information of a PC to a video communication terminal, comprises,
a background processing-device, capturing desktop information of the PC, converting the captured desktop information from a PC format to a format of a local video communication terminal, encoding the converted format to a coded bit stream and outputting;
a terminal processing-device, transferring the coded bit stream from the background processing-device to a remote video communication terminal.

10. The apparatus according to claim 9, wherein the background processing-device comprises:
a capture driver, sending out a triggering command;
a capturing device, receiving the triggering command from the capture driver and capturing the desktop information, then outputting;
an image converter, receiving the captured desktop information from the capturing device and converting into the format of the local video communication terminal, then outputting;
a background encoder, encoding output signal from said image converter into the coded bit stream;
a background bit stream sender, sending the coded bit stream to the terminal processing-device.

11. The apparatus according to claim 10, wherein the background processing-device further comprises an image pre-processor that accepts output of the capturing device, removes unnecessary desktop information and then filters and edits the rest of the desktop information.

12. The apparatus according to claim 9, wherein the terminal processing-device comprises a terminal bit stream transmitter that transfers the coded bit stream to the remote video communication terminal.

13. The apparatus according to claim 12, wherein the terminal processing-device further comprises a terminal decoder that decodes the output bit stream from the background processing-device and outputs to a local output device.

14. The apparatus according to claims 12, wherein the terminal processing-device further comprises a terminal encoder that encodes a local image and then outputs to the terminal bit stream transmitter.

15. The apparatus according to claim 13, wherein the terminal decoder decodes the background processing-device output of which encoding format is different from that of the remote video communication terminal, and then outputs to the terminal encoder -which encodes the decoded bit stream again with an encoding format of the remote video communication terminal, and then outputs to the terminal bit stream transmitter.

16. The apparatus according to claim 10, further comprising:
a message channel device that sends an encoding message of the video communication terminal to the background encoder, sends a transmission speed rate of the local video communication terminal to the background bit stream sender, and sends a control message from the background bit stream sender to the terminal processing-device.

17. The apparatus according to claims 13, wherein the terminal processing-device further comprises a terminal encoder that encodes a local image and then outputs to the terminal bit stream transmitter.

\* \* \* \* \*

UNITED STATES PATENT AND TRADEMARK OFFICE
CERTIFICATE OF CORRECTION

PATENT NO.         : 7,609,288 B2                             Page 1 of 1
APPLICATION NO. : 11/049217
DATED              : October 27, 2009
INVENTOR(S)        : Guo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1256 days.

Signed and Sealed this

Twelfth Day of October, 2010

David J. Kappos
*Director of the United States Patent and Trademark Office*